Aug. 31, 1926.
C. J. ZIRBEL
1,598,230
CREAM SKIMMER FOR MILK BOTTLES
Filed June 16, 1925
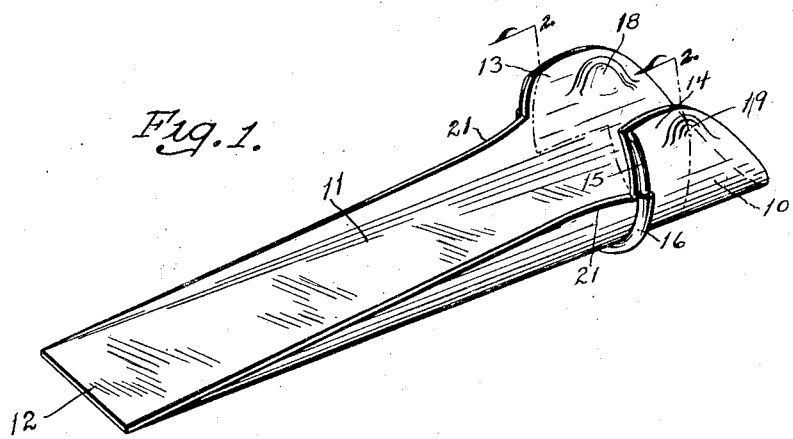
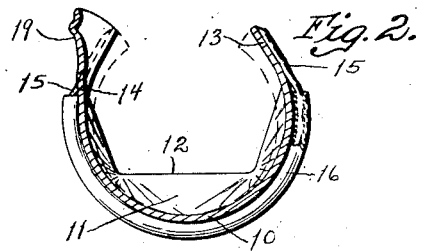
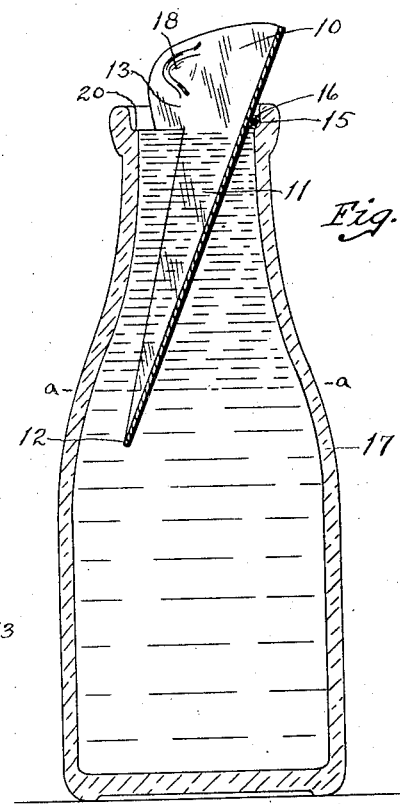
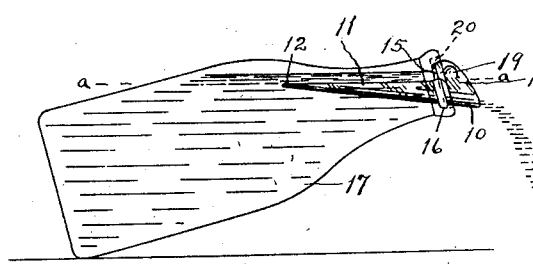
Inventor
C. J. ZIRBEL.
by Earl M. Sinclair Atty.

Patented Aug. 31, 1926.

1,598,230

UNITED STATES PATENT OFFICE.

CARL J. ZIRBEL, OF MONTEZUMA, IOWA.

CREAM SKIMMER FOR MILK BOTTLES.

Application filed June 16, 1925. Serial No. 37,526.

The object of this invention is to provide an improved skimming device adapted to be inserted in a milk bottle to facilitate the removal of cream therefrom.

A further object of this invention is to provide improved means to facilitate pouring cream from the milk in a milk bottle without mixing any of the milk therewith.

A further object of this invention is to provide an improved construction and arrangement for a sealing gasket for sealing the skimming device in the mouth of the bottle.

A further object of this invention is to provide a device of the class described which is simple and economical of construction, efficient in use and which is also easily cleaned.

My invention consists in the construction, arrangement and combination of elements hereinafter set forth, pointed out in the claims and illustrated by the accompanying drawing, in which—

Figure 1 is a perspective view of the device.

Figure 2 is a cross-section on the line 2—2 of Figure 1.

Figure 3 is a vertical section showing the device inserted in a milk bottle as required for practical use.

Figure 4 is a side elevation illustrating the position of the parts in operation.

The major portion of the device may be made from a single piece of sheet metal, such as aluminum or bright tin, by pressing and stamping, and includes a spout portion 10 and a spoon or trough portion 11 formed thereon. The members 10, 11 are formed on an arc of a circle but the terminal or lower end of the spoon or trough portion 11 preferably is substantially plane and flat as shown at 12. The spout portion 10 preferably is formed on an arc of 180 degrees or more and has also substantially parallel side flanges 13, 14 formed on the side margins thereof. The outer end of the spout portion, including its side flanges 13, 14, is also curved or inclined back from its median or lower flow line. The spoon or trough portion 11 merges into the spout portion 10 and adjacent thereto it is formed on an arc of the same radius but of less extent, and such arcuate spoon or trough portion tapers rearwardly or downwardly and merges into the flattened portion 12 as clearly shown.

An arcuate piece of spring wire 15 embraces the base end of the spout 10 and is secured thereto at its ends only, as by soldering. The major portion of the spring wire 15 is covered by a portion of light rubber tubing 16 which forms a sealing gasket.

In practical use the device is inserted within a bottle such as 17 containing milk and cream, the spoon or trough portion 11 being within the bottle and submerged in the cream and milk as shown in Figure 3. To perform this operation, the base portion of the spout is grasped between the thumb and finger of one hand, indentations or seats 18, 19 being provided in the side flanges 13, 14 to facilitate this operation. Pressure is then applied to contract somewhat the base portion of the spout and with it the spring wire 15, thus causing the gasket 16 to more firmly grip the outer periphery of the spout. The device is then inserted until the gasket 16 rests in the rabbet 20 which is provided at the mouth of the bottle for receiving the ordinary milk bottle cap. When pressure is relaxed the spring wire 15 expands causing the gasket to be firmly located in the rabbet, thus forming an effective liquid seal between the spout and the mouth of the bottle, and also causing the device to be held in place by frictional contact.

Then the bottle is tipped as shown in Figure 4 and cream in the upper portion thereof is conveyed through the spoon or trough portion 11 and spout 12 to a suitable location.

The spring wire 15 and gasket 16 are inclined forwardly at their lower sides from the plane perpendicular to the axis of the device, so that the spoon or trough portion 11 normally inclines toward one side of the bottle when properly inserted, as indicated in Figures 3 and 4, so that the upper margins of such portion rest in substantially horizontal position when the bottle is tipped to a position where the cream has been poured off, the normal cream line being indicated substantially at a—a in Figure 4. Thereafter no more fluid can enter the spoon or trough portion 11 by flowing over its margins, and consequently no milk can escape with the cream; and of course no milk can at any time escape around the outside of the spout which is sealed by the gasket 16. Thus the cream can easily and readily be poured off without being mixed with the milk. If desired the upper end of the spoon or trough portion 11 may be restricted or curved inwardly somewhat at the points 21 (Figure 1) to facilitate its insertion in a bottle.

The device is sanitary as it can readily be washed, cleansed and sterilized, as there are no inaccessible parts.

I claim as my invention—

1. A device of the class described comprising integral trough and spout portions, said device adapted to be mounted in a milk bottle with the trough portion inside and the spout portion projecting from said bottle, the base of the spout portion being formed on an arc materially less than the circumference of a circle and adapted to yieldingly engage the mouth of the bottle to hold the device in place.

2. A device of the class described comprising integral trough and spout portions, said device adapted to be mounted in a milk bottle with the trough portion inside and the spout portion projecting from said bottle, the base of the spout portion being formed on an arc materially less than the circumference of a circle and adapted to yieldingly engage the mouth of the bottle to hold the device in place, the base of the spout portion being provided with a gasket formed on an arc of substantially one hundred eighty degrees and forming a liquid seal between it and the mouth of the bottle.

3. A device of the class described comprising integral trough and spout portions, said device adapted to be mounted in a milk bottle with the trough portion inside and the spout portion projecting from said bottle, a spring member embracing the base of said spout portion adapted to yieldingly engage the mouth of the bottle to hold the device in place, and a gasket on said spring member forming a liquid seal.

4. A device of the class described comprising integral trough and spout portions, said device adapted to be mounted in a milk bottle with the trough portion inside and the spout portion projecting from said bottle, a spring wire embracing the base of the spout portion and fixed thereto at its ends only, and a flexible gasket on said spring wire.

5. A device of the class described comprising integral trough and spout portions both formed throughout major portions of their lengths on the arc of a circle, said device adapted to be mounted in a milk bottle having a rabbeted mouth with the trough portion inside and the spout projecting from said bottle, said spout portion being formed with extended side flanges, a spring wire embracing the base of said spout portion and fixed at its ends to said side flanges, and a rubber tubing on said spring wire to form a liquid seal in the rabbet of the milk bottle.

6. A device of the class described comprising integral trough and spout portions both formed throughout major portions of their lengths on the arc of a circle, the arc of said spout portion being of greater extent than the arc of said trough portion and said trough portion tapering from its forward to its rear end and merging into substantially a plane and flat portion.

Signed at Montezuma, in the county of Poweshiek and State of Iowa, this 8th day of May, 1925.

CARL J. ZIRBEL.